(12) United States Patent
Goldman et al.

(10) Patent No.: US 8,527,478 B1
(45) Date of Patent: Sep. 3, 2013

(54) HANDLING BULK AND INCREMENTAL UPDATES WHILE MAINTAINING CONSISTENCY

(75) Inventors: Seth Goldman, New York, NY (US); David Eustis, New York, NY (US); Tudor Hulubei, New York, NY (US); John Danaher, New York, NY (US)

(73) Assignee: Google Inc., Mountain View, CA (US)

(*) Notice: Subject to any disclaimer, the term of this patent is extended or adjusted under 35 U.S.C. 154(b) by 224 days.

(21) Appl. No.: 12/973,180

(22) Filed: Dec. 20, 2010

(51) Int. Cl.
*G06F 17/30* (2006.01)

(52) U.S. Cl.
USPC .......................... 707/695; 707/694; 707/737

(58) Field of Classification Search
None
See application file for complete search history.

(56) References Cited

U.S. PATENT DOCUMENTS

| | | | |
|---|---|---|---|
| 5,995,980 | A | 11/1999 | Olson et al. |
| 6,523,047 | B1 * | 2/2003 | Rafanello et al. ............ 711/100 |
| 6,640,223 | B1 | 10/2003 | Jones et al. |
| 7,650,331 | B1 | 1/2010 | Dean et al. |
| 2005/0228784 | A1 | 10/2005 | McCauley et al. |
| 2006/0031433 | A1 | 2/2006 | Patrick et al. |
| 2007/0106455 | A1 | 5/2007 | Fuchs |
| 2008/0163073 | A1 | 7/2008 | Becker et al. |
| 2009/0228528 | A1 | 9/2009 | Ercegovac et al. |
| 2009/0319550 | A1 | 12/2009 | Shau et al. |

OTHER PUBLICATIONS

"Distributed Lock Manager" [online] [Retrieved Jul. 21, 2010] Retrieved from the internet: <http://en.wikipedia.org/wiki/distributed_lock_manager>, 4 pages.
WebBase: A Repository of Web Pages, Jun Hirai, Sriram Raghavan, Hector Garcia-Molina and Andreas Paepcke, 1999, 20 pages.
The Chubby Lock Service for Loosely-Coupled Distributed Systems, Mike Burrows, Nov. 2006, 16 pages.
Jeffrey Dean and Sanjay Ghemawat, MapReduce: Simplified Data Processing on Large Clusters, Dec. 2004, 13 pages.

* cited by examiner

*Primary Examiner* — Anteneh Girma
(74) *Attorney, Agent, or Firm* — Lerner, David, Littenberg, Krumholz & Mentlik, LLP (57) ABSTRACT

Aspects of the invention relate generally to updating of interconnected features stored in a repository while maintaining highly consisting views of the repository data. More specifically, the invention relates to updating some features in bulk while providing for incremental updates for other features which are not completely independent of the bulk edits. The bulk edits are grouped into stages or "epochs" associated with various manageable states, including, for example, a building state, an approval state, a live state, and an abandoned state. The current view of the data is thus based on the status of each of the epochs. At the same time, incremental edits may be performed where the incremental edits are independent of the current live bulk epoch. This allows the system to maintain consistent views of the data until an entire group of features moves into the live state.

18 Claims, 7 Drawing Sheets

Storing bulk features in a first partition, each associated with a feature ID and a first epoch value, and including references only to other bulk features
402

Storing incremental features in a second partition, each associated with a feature ID, some including references to other incremental and other bulk features
404

Generating a table of edits to the bulk features (edited bulk features associated with a feature ID), the table including a second epoch value identifying the edits and a status indicator
406

Generating a second version of each of the incremental features based on the table of edits and the second epoch value, such that each second version includes references to bulk features of the first epoch value and edits of the second epoch value
408

Storing the second versions in the second partition
410

Receiving a request for a feature including a feature ID from a requesting client device
412

FIGURE 4B

Updating the status indicator of the table to allow client devices to access the edits of the second epoch value
424

HANDLING BULK AND INCREMENTAL UPDATES WHILE MAINTAINING CONSISTENCY

BACKGROUND OF THE INVENTION

Systems which provide geographic information services to users typically require constant updating in order to maintain usefulness and accuracy. Geographic systems may continuously update the features which are used to describe or generate a particular view of the world (map or map information), for example, information regarding the course and location of roadways, business information, size and location of buildings and other structures, etc. In addition, these features may be associated with any number of "references" which associate or link two or more features together. In other words, a reference may describe an instance of a relation between the two features.

For example, if a town (feature T) is contained within a state (feature S), then feature T should be navigated to by way of feature S. The relation is between S and T ("is contained within"), and the reference is therefore an instance of two features (S and T) involved in the relation. Thus, changes or updates to feature S may have an effect on feature T. In another example, updating road data on one or two segments of a road network will undoubtedly affect the attributes of the surrounding segments. For this reason, road data may be considered highly "dependent" and thus may have a large number of references. Accordingly, maintaining consistent views of the world (maps and map information) not only involves updating the features themselves but also maintaining the consistencies of any references.

Presently, updating large geographic information systems may involve either completely locking users out during an updating period or performing an update or entering changes at a time when users are less likely to request information. These systems may operate under the assumption that all of the data is highly dependent (there are many references) and must be delivered in bulk. As a result, the entire world of data may need to be re-written periodically, such as every week, in order to maintain consistency. However, not all edits may affect the consistency of the data. For example, edits to a telephone number or the operating hours of a business may be completely independent of any other features, and thus may be allowed independent of other changes in the system. Accordingly, bulk updating all of the information periodically may delay data updates and requires enormous processing power.

Even using the total bulk updating model, it may be difficult to merge highly dependent data from multiple sources. Some systems may partition the world based on the feature type and country. Highly dependent types, such as roads, may only be taken from a single source per country. This may present problems when managing cross-country references in these data sources, for example, when attempting to connect road networks across borders.

BRIEF SUMMARY OF THE INVENTION

Aspects of the invention relate generally to updating interconnected features stored in a repository while maintaining highly consistent views of the repository data. More specifically, aspects relate to updating some features in bulk while providing for incremental updates for other features which are not completely independent of the bulk edits. The bulk edits are grouped into stages or "epochs" associated with various manageable states, including, for example, a building state, an approval state, a live state, and an abandoned state. The current view of the data is thus based on the status of each of the epochs. At the same time, incremental edits may be performed where the incremental edits are not completely independent of the current live bulk epoch by specifying what a particular feature's references would look like at each possible live bulk epoch. The references may then be provided to users requesting the feature based on which bulk epoch is in the live state. This may allow for many versions of the feature to account for the possibility that a range of bulk epochs may be in the live state. This allows the system to maintain consistent views of the data until an entire group of features moves into the live state.

One aspect of the invention provides a computer-implemented method of updating repository data. The method includes storing a plurality of first features in a first partition of a data repository, each first feature including a feature identifier that identifies that respective first feature; storing a plurality of second features in a second partition of the repository, each second feature including a feature identifier that identifies that respective second feature and a subset of the plurality of second features including references identifying a feature identifier of a particular first feature of the plurality of first features; generating a table of edit data including edits to the plurality of first features, each edit including an associated feature identifier of the respective first features, the edits to the plurality of first features being associated with an epoch value and the table including a status column describing a status of the edits for a particular epoch value as in an editing status where the edits to the plurality of first features are not accessible by client devices; generating a second version of each of the second features by updating the references identifying the feature identifier of the particular first feature based on the epoch value and the table of edits; storing the second versions of each of the second features in the second partition of the repository; and updating the status column to a live state where the edits for the particular epoch value are accessible by client devices.

In one example, the method also includes receiving a request including a feature identifier from a given one of the client devices; identifying a first feature in the repository by searching the table of edits for the feature identifier and by searching the second versions of each of the second features in the second partition for the feature identifier; and transmitting the identified feature to the client device.

In another example, the method also includes receiving a request including a feature identifier from a given one of the client devices; identifying a second feature in the repository by searching the table of edits for the feature identifier and by searching the second versions of each of the second features in the second partition for the feature identifier; and transmitting the identified feature to the client device. In another example, a subset of the plurality of first features includes references having the feature identifiers of other ones of the first features, and no references including the feature identifiers of any second features. In another example, each of the plurality of second features is associated with a timestamp indicating a latest edit to the respective second feature, and generating a second version of each of the second features also includes generating a timestamp for each second version of the second features. In another example, the method also includes generating a third version of a particular one of the second features independent of the epoch value. In another example, the table includes edit data associated a second epoch value, and generating a second version of a particular one of the second features also includes generating a reference to edit data associated with the second epoch value; and generating a reference to edit data associated with the particular epoch value. In another example, the method also includes before updating the status column to a live state, receiving a request including a feature identifier from a given one of the client devices; identifying the second version of the particular one of the second features based on the received feature identifier; and transmitting the second version of the particular one of the second features and the reference to edit data associated with the second epoch value. In another example the method also includes after updating the status column to a live state, receiving a request including a feature identifier from a given one of the client devices; identifying the second version of the particular of one of the second features; and transmitting the second version of the particular one of the second features and the reference to edit data associated with the particular epoch value.

Another aspect of the invention provides a computer. The computer includes memory including a first partition for storing a plurality of first features, each first feature including a feature identifier that identifies that respective first feature, the memory also including a second partition for storing a plurality of second features, each second feature including a feature identifier that identifies that respective second feature and a subset of the plurality of second features including references identifying a feature identifier of a particular first feature of the plurality of first features. The computer also includes a processor operable to generate a table of edit data including edits to the plurality of first features, each edit including an associated feature identifier of the respective first features, the edits to the plurality of first features being associated with an epoch value and the table including a status column describing a status of the edits for a particular epoch value as in an editing status where the edits to the plurality of first features are not accessible by client devices; generate a second version of each of the second features by updating the references identifying the feature identifier of the particular first feature based on the epoch value and the table of edits; store the second versions of each of the second features in the second partition of the repository; and update the status column to a live state where the edits for the particular epoch value are accessible by client devices.

In one example, the processor is also operable to receive a request including a feature identifier from a given one of the client devices; identify a first feature in the repository by searching the table of edits for the feature identifier and by searching the second versions of each of the second features in the second partition for the feature identifier; and transmit the identified feature to the client device. In another example, the processor is also operable to receive a request including a feature identifier from a given one of the client devices; identify a second feature in the repository by searching the table of edits for the feature identifier and by searching the second versions of each of the second features in the second partition for the feature identifier; and transmit the identified feature to the client device. In another example, the first partition of the memory also includes a subset of the plurality of first features that include references having the feature identifiers of other ones of the first features, and the first partition includes no references including the feature identifiers of any second features. In another example, the second partition of the memory also includes, for each of the plurality of second features, a timestamp indicating a latest edit to the respective second feature, and the processor is also operable to generate a timestamp for each second version of the second features when the processor generates a second version of each of the second features. In another example, the processor is also operable to generate a third version of a particular one of the second features independent of the epoch value. In another example, the processor is also operable to generate edit data associated a second epoch value for the table; and generate a reference to edit data associated with the second epoch value and a reference to edit data associated with the particular epoch value when generating a second version of a particular one of the second features. In another example, the processor is also operable to before updating the status column to a live state, receive a request including a feature identifier from a given one of the client devices; identify the second version of the particular one of the second features based on the received feature identifier; and transmit the second version of the particular one of the second features and the reference to edit data associated with the second epoch value. In another example, the processor is also operable to after updating the status column to a live state, receive a request including a feature identifier from a given one of the client devices; identify the second version of the particular one of the second features; and transmit the second version of the particular one of the second features and the reference to edit data associated with the particular epoch value.

Further, each of the aforementioned methods and examples herein may be implemented by a computer including a processor and memory coupled to the processor. The memory stores information accessible by the processor, including instructions that may be executed by the processor to perform the aforementioned actions.

DETAILED DESCRIPTION

Figure 1:
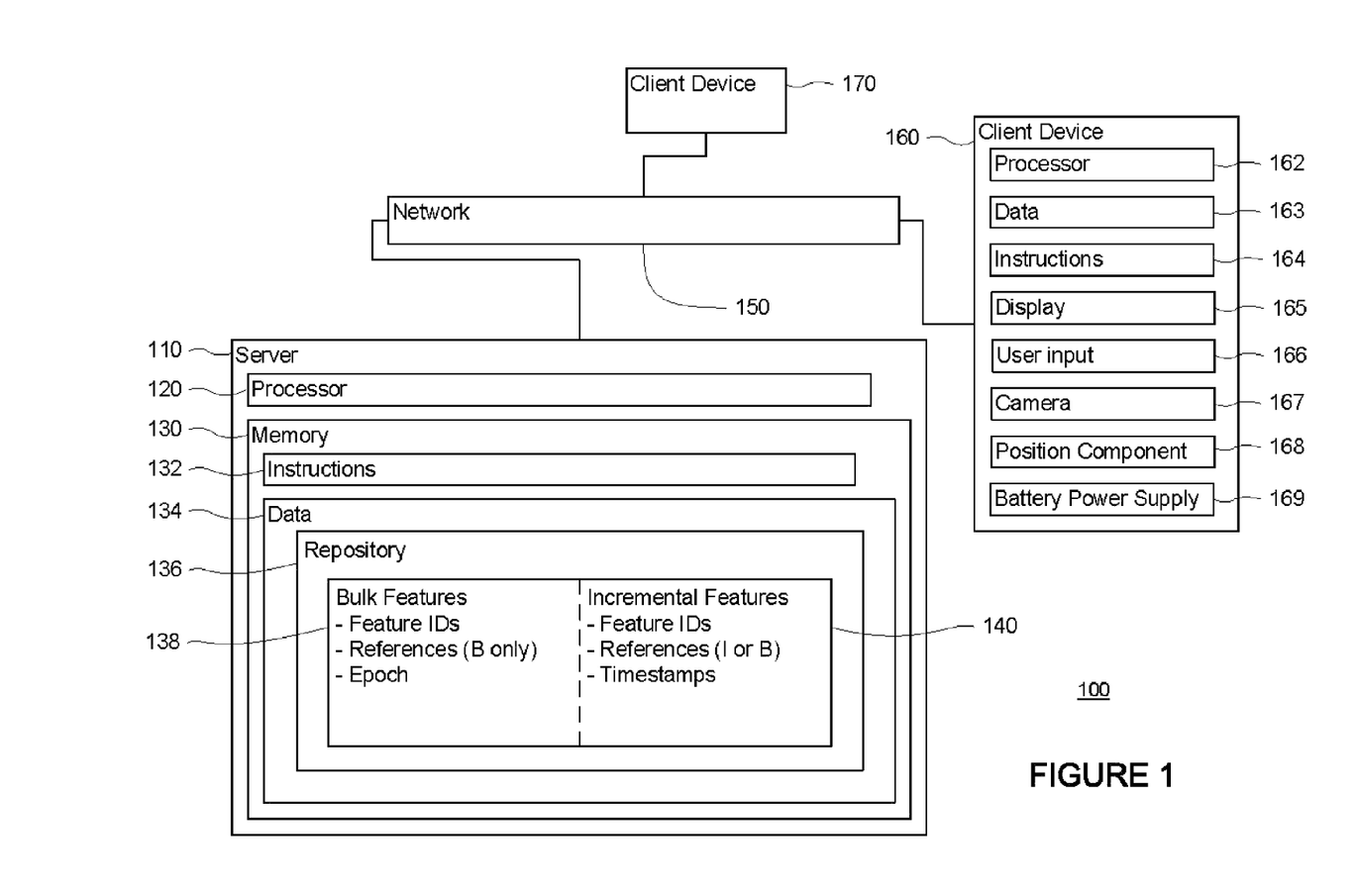
FIG. 1 is a functional diagram of a system in accordance with an aspect of the invention.
Figure 2:
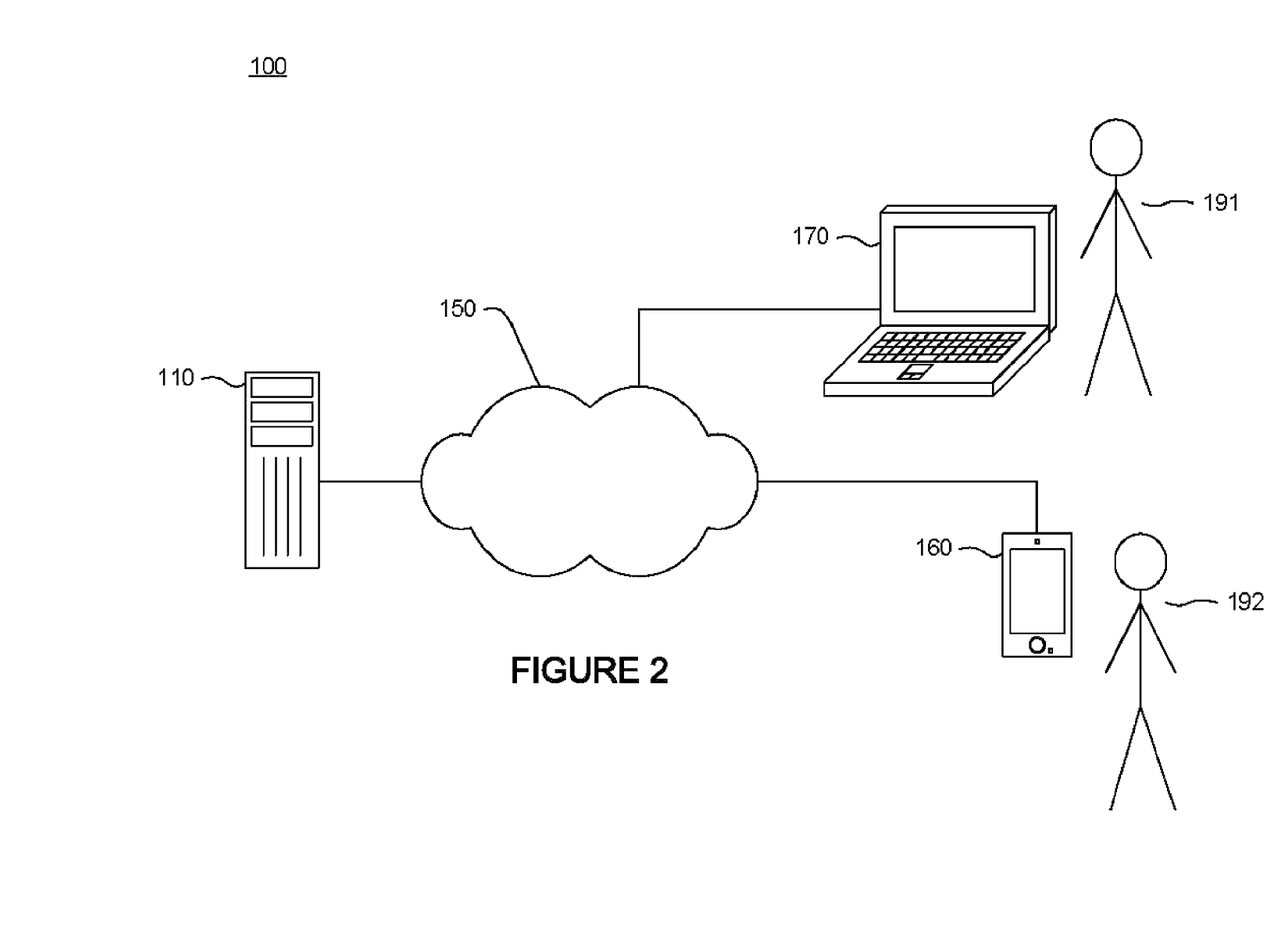
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations or servers) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, position component 168, accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data with a server over a network such as the Internet. By way of example only, client device 160 may be a wireless-enabled PDA or a cellular phone capable of obtaining information via the Internet. The user may input information using a small keyboard (in the case of a Blackberry-type phone), a keypad (in the case of a typical cellular phone) or a touch screen (in the case of a PDA).

Repository 136 may share feature-related data as part of memory 130. Although shown as a single block within server 110, it will be understood that repository 136 may actually refer to storage associated with a single server or multiple servers. As described above, the repository may include feature data which describes a world, for example maps and associated map information, which may be queried and returned to a client device for display to a user. The repository may be partitioned into two or more partitions such that data may be stored in each of the partitions.

For example, one partition may be used to store bulk features 138. Bulk features may include features which are updated in bulk, for example, highly dependent features such as road segments, etc. It will be understood, however, that road segments and other highly dependent features need not be designated as bulk features and may actually be designated as incremental features which may be updated incrementally as described in more detail below. Thus, at least some portion of or all of the road segments in a repository of geographic information may be designated as incremental features or bulk features. Accordingly, some highly dependent features, such as road segments, may be used herein as examples of incremental features or bulk features.

Each bulk feature may be associated with a feature identifier (feature ID), references, and an epoch. A feature ID may be used to identify the bulk feature as well as other features of the repository. Thus, a particular reference of a bulk feature may actually include the feature ID of the referenced feature. Bulk features may only include references to other bulk features. In addition, the references need not include the epoch of the referenced feature as bulk features may only include references to other bulk features of the same epoch.

Figure 3A:
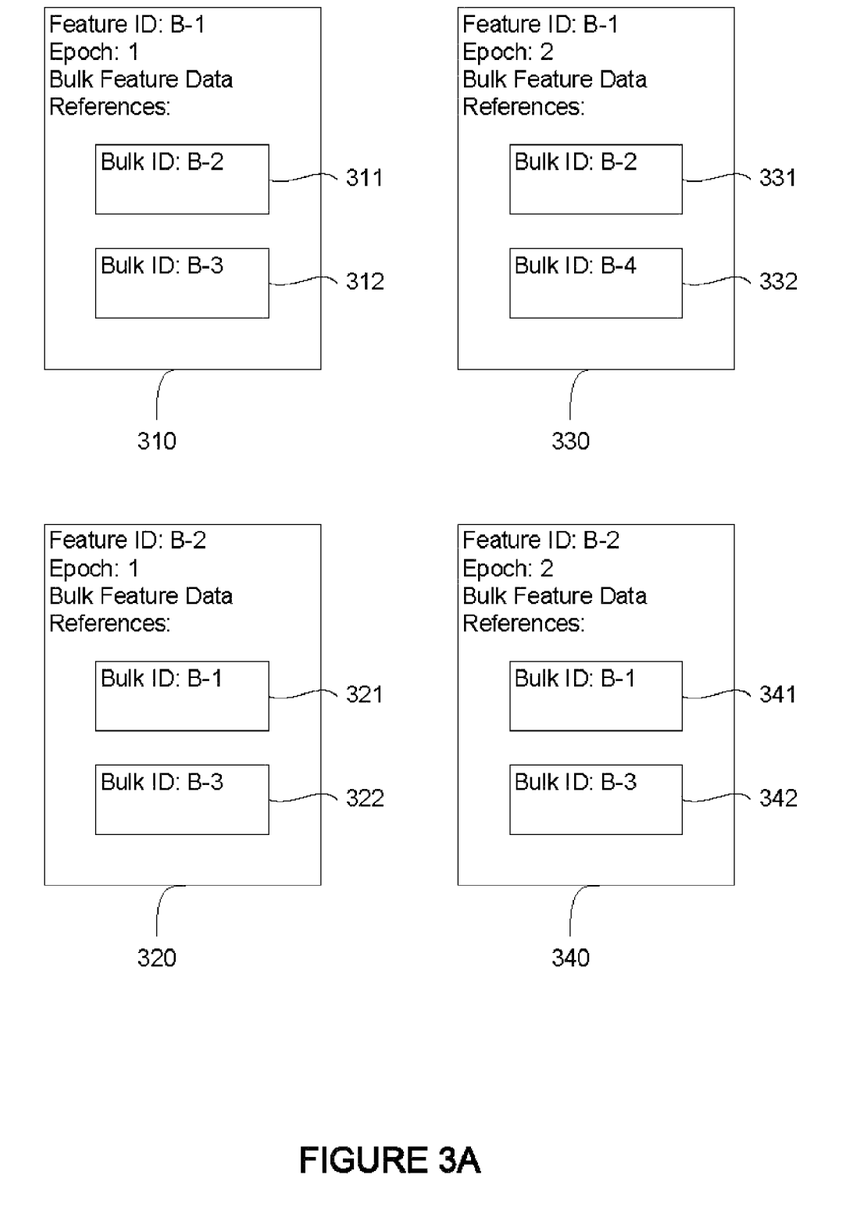
FIGS. 3A and 3B are diagrams of exemplary data in accordance with aspects of the invention.

FIG. 3A includes exemplary bulk features from two different epochs. For example, each of bulk features of 310, 320, 330, and 340 includes bulk feature information. Bulk features 310 and 320 are identified by feature IDs B-1 and B-2, respectively. Both bulk features 310 and 320 are also associated with epoch 1 and only include references (311-312 and 321-322) to other bulk features but do not identify a particular epoch.

Bulk features 330 and 340 represent bulk features 310 and 320 at epoch 2. These bulk features at epoch 2 again only include references (331-332 and 341-342) to other bulk features but do not identify a particular epoch. Between epoch 1 and epoch 2, feature B-1 is changed such that reference 312 to feature B-3 is updated to feature B-4 at reference 332. Between epoch 1 and epoch 2, feature B-2 is changed such that the bulk feature data is updated.

The bulk features 138 may (but need not) be organized as a table which holds all bulk epoch information and the current state of each epoch. Again, the epoch may be described as a series of replacements edits to the bulk features 138. A particular epoch's edits to a particular bulk feature and the particular bulk feature itself may be considered different versions of the same feature. In other words, the feature at two different epochs may be considered two different versions. Thus, each version of a bulk feature may be uniquely identified by its feature ID (the same for each version of a bulk feature) and an epoch ID (different for each version of a bulk feature). The bulk epoch table may include a column or series of entries identifying the state of the bulk epoch as in, for example, an in-progress state (being written), a committed state (ready to go live), a blessed state (live), and an abandoned state (not to be used).

As shown in FIG. 1, another partition of repository 136 may be used to store incremental features 140. Incremental features 140 may be updated incrementally (as opposed to in bulk) and independently of other features. For example, a business listing including a phone number may be designated as incremental feature because updating a phone number should have little to no effect on the rest of the repository data. However, as explained above, incremental features may also include other features, such as road segments, which are dependent upon other features and to which changes may affect some portion of the repository data. Incremental features may be updated in place or in near real time, such as, for example, on the order of minutes.

Similar to bulk features, incremental features may be associated with feature IDs which may be used to identify and retrieve these features.

Incremental features 140 may also include references to other features. For example, a particular incremental feature may include references to other bulk features and/or other incremental features. Each reference to another incremental feature may include the feature ID of the other incremental feature. Each reference to a bulk feature may include a bulk feature ID and an epoch. The particular incremental feature may also include references to the same bulk feature at different epochs.

Each time an incremental feature is edited or updated, the updated feature is associated with a new timestamp. For example, a user may request or call the incremental feature in order to make any edits. A transactional storage system, such as a database, may be used to resolve any conflicts if multiple edits are attempted on the same feature. The transactional system may effectively serialize the calls to ensure that each edit leaves the feature in a consistent state. Accordingly, there may be a plurality of different versions of the same incremental feature (with the same feature ID) at different timestamps.

Figure 3B:
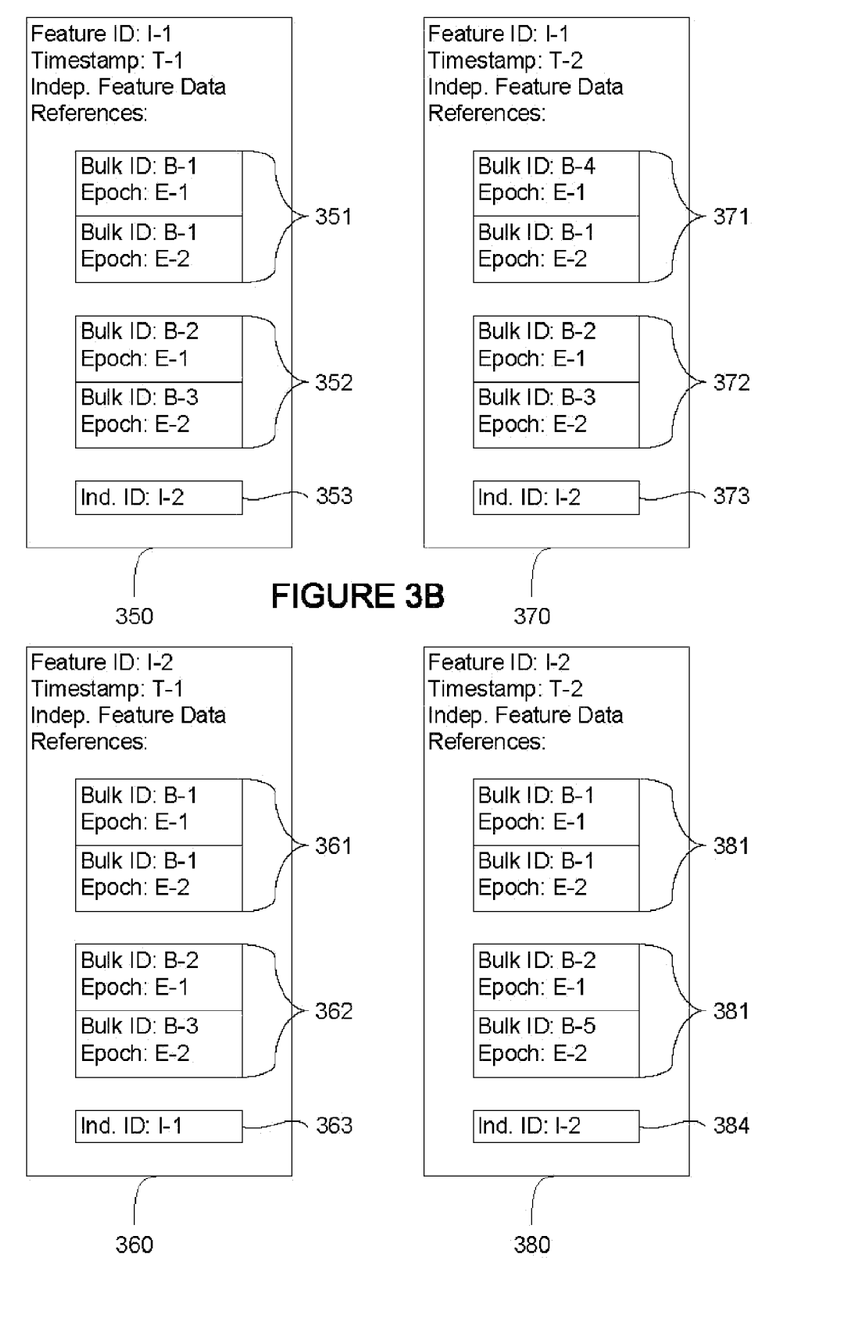

FIG. 3B includes exemplary incremental features from two different timestamps. For example, each of incremental features 350, 360, 370, and 380 includes incremental feature information. Incremental features 350 and 360 are identified by feature IDs I-1 and I-2, respectively. Both incremental features 350 and 360 are also associated with timestamp T-1. These incremental features also include references 351-352 and 361-362 to bulk features and references 353 and 363 to incremental features.

In the example of FIG. 3, each of the references to bulk features includes a version of the reference for each bulk epoch, assuming in the example, there are only epochs 1 and 2. Incremental features 370 and 380 represent incremental features 350 and 360 associated with timestamp T-2. These incremental features also include references 371-372 and 381-382 to bulk features and references 373 and 383 to incremental features. Again, each of the references to bulk features includes a version of the reference for each bulk epoch, again assuming in the example that there are only epochs 1 and 2. Between timestamps T-1 and T-2, incremental feature I-1 us updated by changing the feature ID at epoch 1 of reference 351 to the feature ID at epoch 2 of reference 371. Between timestamps T-1 and T-2, incremental feature I-2 us updated by changing the feature ID of reference 363 to the feature ID of reference 383.

Incremental features 140 may also be associated with "backreferences" or "reverse references." For example, if feature A refers to feature B, feature B may include a "backreference" to feature A. These backreferences may be required so that if any edits are performed on feature B, the backreference to feature A may direct the server to determine whether the references in A are still consistent with the edits to B before the edit goes live. These backreferences may only originate from another incremental feature. As described in more detail below, backreferences to bulk features need not exist.

Similar to bulk features 138, incremental features 140 may also be organized as a table which includes all of the feature's information. For example, the table may include the feature ID, the feature data, a timestamp, and any associated references.

Again, repository 136 may be partitioned such that bulk features 138 may only include reference to other bulk features (no incremental features), whereas incremental features 140 may include references to bulk features and/or incremental features. As bulk features cannot contain references to incremental features, any bidirectional references must tie two bulk or two independent features together. For example, A and B may be a route and a road segment, respectively. These features may contain bidirectional references, where A includes a reference to B and B includes a reference to A. If B is a bulk feature, A must also be a bulk feature, and if A is an incremental feature, B must also be an incremental feature. The reverse must also be true. Thus, the feature pairs with bidirectional references must be either both bulk or both incremental features.

In addition to the operations described below and illustrated in the figures, various operations in accordance with aspects of the invention will now be described. It should also be understood that the following operations do not have to be performed in the precise order described below. Rather, various steps can be handled in a different order or simultaneously.

A new epoch begins in the "in-progress" state. During this time, edits (deltas) to the bulk features 138 may be written to the bulk epoch table. As described above, the table may include a status column identifying the edits as "in-progress" or some other similar designation. Bulk features can only be edited in the "in-progress" state of an epoch. While there may be many different epochs in various states, only one epoch may be in the "in-progress" state at any given time. When writing a particular bulk feature associated with a particular feature ID, there may not be any previous incremental feature versions associated with the same feature ID. If a client device queries any of the edited features, the server will not return any of changes to the features associated with an "in progress" epoch.

As bulk features may only be written in the "in-progress" state and as references to bulk features may only reference to epochs which have gone live, a bulk feature may never change out from under a reference to it. For example, a bulk feature A may be written once at bulk epoch 1 and then never modified. Thus, a feature A at bulk epoch 1 may be immutable once written. Therefore, any references to feature A at bulk epoch 1 cannot become invalid. Therefore it may be unnecessary to store a list of backreferences to bulk features.

Once the edits have been completed, the status of the epoch may be updated. In some examples, the status of a particular epoch may be updated to an "approval" or other similar state which allows for internal validation checks of the edits, for example, for quality or accuracy. The validation checks may include using Google's MapReduce product as described in the article by Jeffrey Dean and Sanjay Ghemawat, entitled "MapReduce: Simplified Data Processing on Large Clusters," *OSDI'04: Sixth Symposium on Operating System Design and Implementation, San Francisco, Calif.*, (2004), and U.S. Pat. No. 7,650,331 to Dean, et al., the disclosures of which are hereby incorporated herein by reference. MapReduce may be run over a portion of or the entire epoch to ensure that various benchmarks have been met. For example, the validation checks may include checking bulk feature edits to ensure that there is no previous incremental feature associated with any other bulk feature's feature ID, that the bulk features only include references to other bulk features (without epoch designation), that there are no references to incremental features, etc. The validation checks may also include checking incremental features to ensure previous bulk features including the same feature ID, that references include bulk features with epochs and incremental features without epochs, etc.

Once each of the bulk epoch features have been written and/or edited, the incremental features must also be updated. For example, if bulk epoch X has been completed, any incremental features with references to bulk features must be updated, such as by generating a new timestamp to include any updated references to the appropriate feature at bulk epoch X.

When the changes have been completed, and in some examples validated, the bulk epoch may be moved to a "live" or other similar state. Once an epoch is moved to the live state, the bulk features may be accessed by client devices and may not be "abandoned". At any point in time before going live, a bulk epoch may be set to the abandoned state where all of the changes of the bulk epoch are ignored or are no longer visible to any client device. Though it is not necessary, in some examples, in order for a bulk epoch to go live, all previous bulk epochs must also be live or abandoned.

As described above, the status of the bulk epochs may be identified in the bulk epoch table. Whenever the table is updated, all of the repository servers may be notified via a separate mechanism with strong consistency and coordination such as a combination of Google's Chubby Lock Service as described in Mike Burrow's The Chubby Lock Service for Loosely-Coupled Distributed Systems, OSDI'06: Seventh Symposium on Operating System Design and Implementation, Seattle, Wash., November, 2006, incorporated herein by reference, and the Paxos algorithm as described by Leslie Lamport in "Part-Time Parliament," *ACM Transactions on Computer System*, 16, 2 (May 1998), 133-169, and "Paxos Made Simple," (November 2001), the entire disclosures of which are incorporated herein by reference. Thus, each time the status of the bulk epoch table is changed, this mechanism may be used to effect the changes and maintain consistent views of the repository data. In this regard, a single write to the bulk epoch table updating the status of the epochs may make an entire batch of bulk features accessible to clients or abandoned.

Client devices may request various features from the repository by identifying a particular feature ID in a request to a server managing the repository. Client devices requesting data from the repository may not know whether a particular feature is incremental or bulk. For example, the server may receive a request for a particular feature including a feature ID and execute searches at both the bulk feature data partition and the incremental feature data partition. If the request also includes a timestamp and an epoch, the server may search the bulk feature data partition using the feature ID and the received epoch and the incremental feature data partition using the feature ID and the received timestamp. Every request which does not identify a specific epoch implicitly occurs at the last live epoch. Thus, all bulk features may be read at the last live epoch and all incremental features which include references to bulk features may have their references projected towards the last live epoch. In addition, every request for an incremental feature which does not identify a specific timestamp implicitly occurs at the latest timestamp.

If the request includes an epoch, the client device may receive the requested epoch, so long as the requested epoch is not in the "in-progress" or "abandoned" state. If the client device does not specify a particular epoch, the client device may receive the current "live" epoch.

Figure 4A:
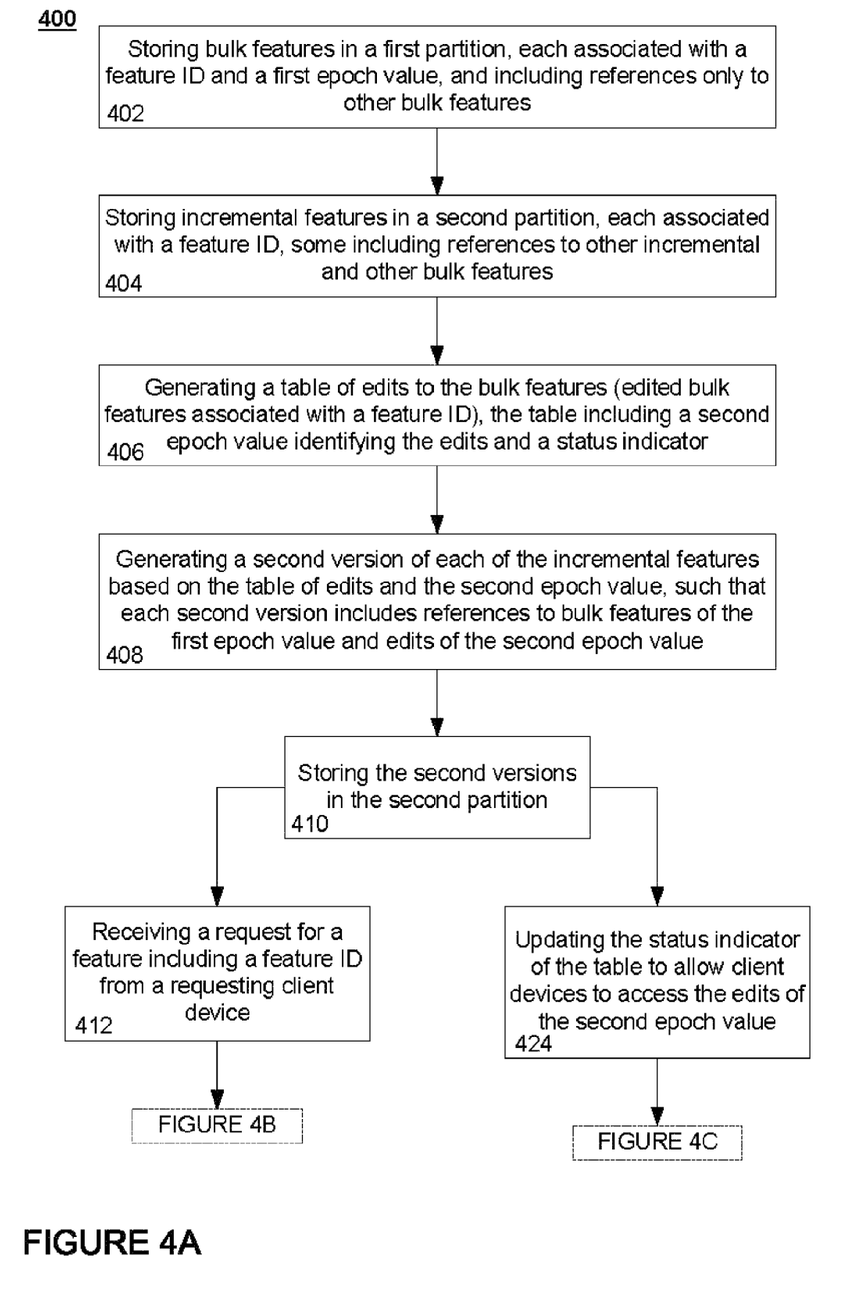
FIGS. 4A, 4B, and 4C are an exemplary flow diagram in accordance with aspects of the invention.
Figure 4B:
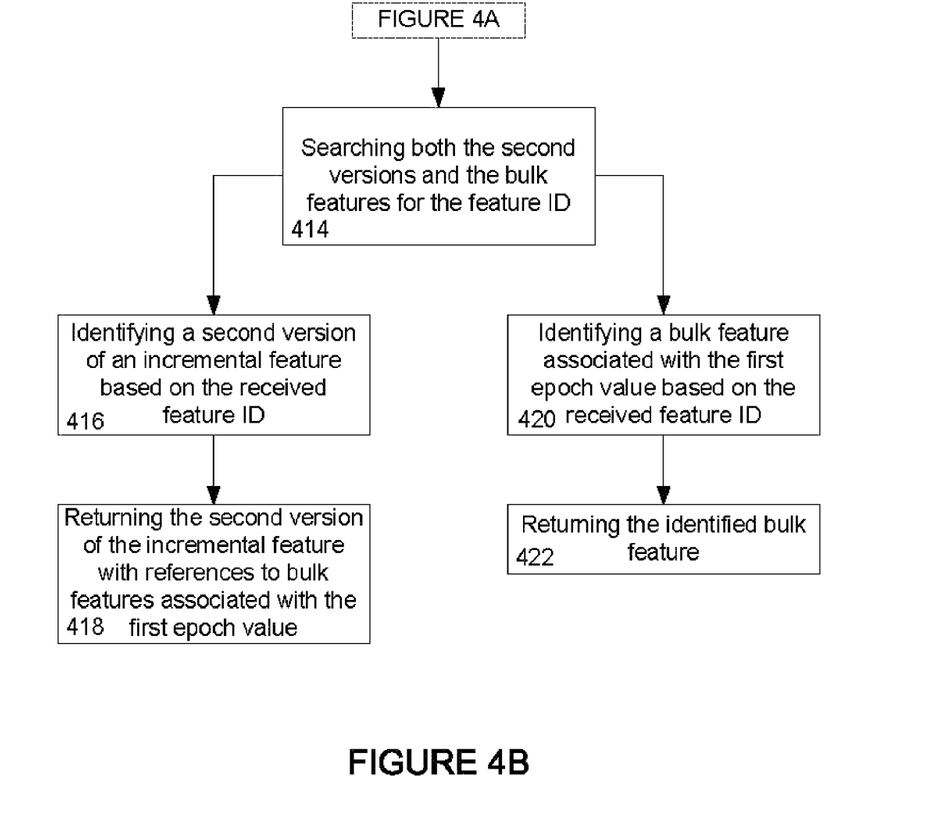
Figure 4C:
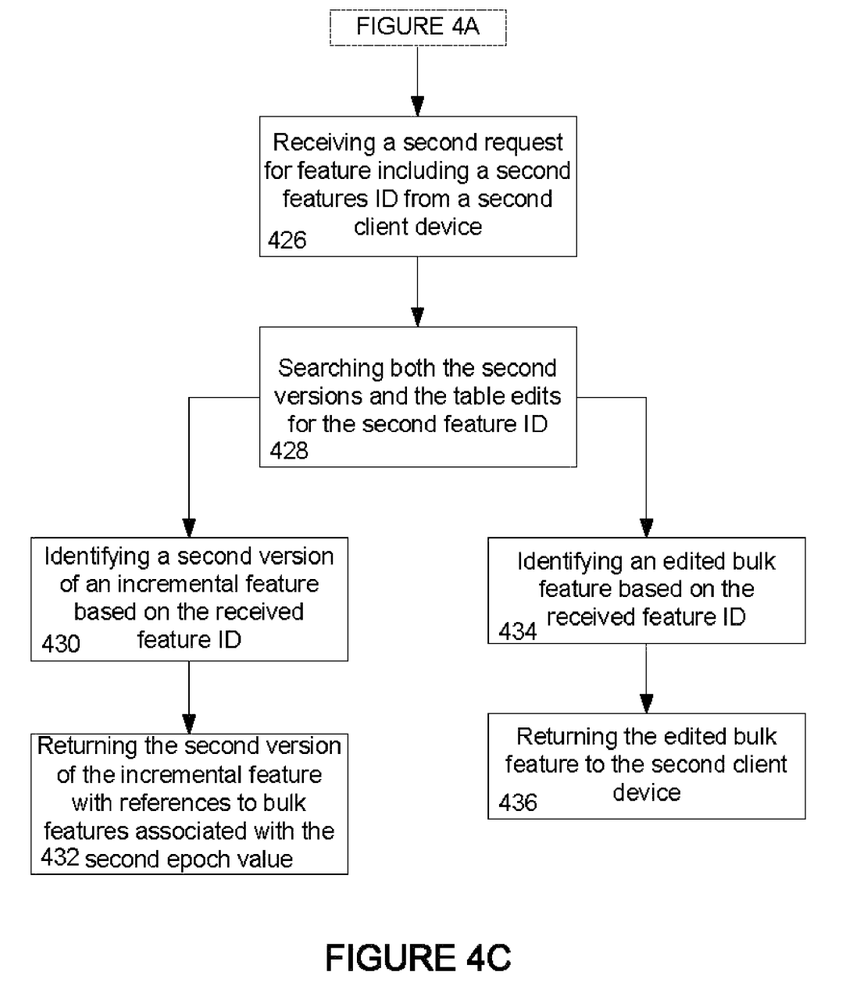

Flow diagram 400 shown in FIGS. 4A, 4B, and 4C depicts aspects of the invention which may be performed by one or more servers or processors administering a repository including a first partition and a second partition. As shown in block 402 of FIG. 4A, the server stores bulk features in a first partition. These bulk features are each associated with a feature ID and a first epoch value. As described above, bulk features only include references to other bulk features (or no references to any incremental features). At block 404, the server also stores incremental features in a second partition. The incremental features are each associated with a feature ID. Some of the incremental features include references to other incremental and other bulk features.

At block 406, the server generates a table of edits to the bulk features. These edited bulk features are associated with feature IDs. Each edit is associated with a second epoch value identifying the edits and a status indicator. As described above, while the features are being written or edited, they are not accessible by client devices. Once the edits have been written, at block 408, a second version of each of the incremental features is generated based on the table of edits and the second epoch value. Each second version includes which includes a reference to a bulk feature includes both (1) references to bulk features of the first epoch value and (2) edits of the second epoch value. These second versions are then stored in the second partition at block 410.

After these second versions have been stored (but before the update of block 424 has been performed), the server may receive a request from a client device for a feature including a feature ID at block 412. Turning to block 414 of FIG. 4B, the server searches both the second versions and the bulk features for the received feature ID. If the server identifies a second version of an incremental feature based on the received feature ID as shown in block 416, the server returns the second version of the incremental feature with references to bulk features associated with the first epoch value to the requesting client device as shown in block 418. If the server identifies a bulk feature associated with the first epoch value based on the received feature ID as shown in block 420, the server returns the identified bulk feature as shown in block 422.

Returning to block 424 of FIG. 4A, after these second versions have been stored, the server updates the status indicator of the table to allow client devices to access the edits of the second epoch value. Turning to block 426 of FIG. 4C, the server receives a second request for a feature including a second features ID from a second client device. At block 428, the server searches both the second versions stored in the second partition and the table edits for the second feature ID. If the server identifies a second version of an incremental feature based on the received feature ID as shown in block 430, the server returns the second version of the incremental feature with references to bulk features associated with the second epoch value to the second client device as shown in block 432. If the server identifies an edited bulk feature based on the received feature ID as shown in block 434, the server returns the edited bulk feature as shown in block 436.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A computer-implemented method of updating repository data, the method comprising:
    storing a plurality of first features in a first partition of a data repository, each first feature including a feature identifier that identifies that respective first feature;
    storing a plurality of second features in a second partition of the repository, each second feature including a feature identifier that identifies that respective second feature and a subset of the plurality of second features including references identifying a feature identifier of a particular first feature of the plurality of first features;
    generating a table of edit data including edits to the plurality of first features, each edit including an associated feature identifier of the respective first features, the edits to the plurality of first features being associated with a value and the table including a status column describing a status of the edits for a particular value as in an editing status where the edits to the plurality of first features are not accessible by client devices;
    generating a second version of each of the second features by updating the references identifying the feature identifier of the particular first feature based on the value and the table of edits;
    storing the second versions of each of the second features in the second partition of the repository; and
    updating the status column to a live state where the edits for the particular value are accessible by client devices.

2. The method of claim 1, further comprising:
    receiving a request including a feature identifier from a given one of the client devices;
    identifying a first feature in the repository by searching the table of edits for the feature identifier and by searching the second versions of each of the second features in the second partition for the feature identifier; and transmitting the identified feature to the client device.

3. The method of claim 1, further comprising:
    receiving a request including a feature identifier from a given one of the client devices;
    identifying a second feature in the repository by searching the table of edits for the feature identifier and by searching the second versions of each of the second features in the second partition for the feature identifier; and
    transmitting the identified feature to the client device.

4. The method of claim 1, wherein a subset of the plurality of first features includes references having the feature identifiers of other ones of the first features, and no references including the feature identifiers of any second features.

5. The method of claim 1, wherein each of the plurality of second features is associated with a timestamp indicating a latest edit to the respective second feature, and wherein generating a second version of each of the second features further includes generating a timestamp for each second version of the second features.

6. The method of claim 1, further comprising generating a third version of a particular one of the second features independent of the value.

7. The method of claim 1, wherein
    the table includes edit data associated a second value, and wherein generating a second version of a particular one of the second features further includes:
    generating a reference to edit data associated with the second value; and
    generating a reference to edit data associated with the particular value.

8. The method of claim 7, further comprising:
    before updating the status column to a live state, receiving a request including a feature identifier from a given one of the client devices;
    identifying the second version of the particular one of the second features based on the received feature identifier; and
    transmitting the second version and the reference to edit data associated with the second value.

9. The method of claim 7, further comprising:
    after updating the status column to a live state, receiving a request including a feature identifier from a given one of the client devices;
    identifying the second version of the particular one of the second features; and
    transmitting the second version of the particular one of the second features and the reference to edit data associated with the particular value.

10. A computer comprising:
    memory including a first partition for storing a plurality of first features, each first feature including a feature identifier that identifies that respective first feature, the memory also including a second partition for storing a plurality of second features, each second feature including a feature identifier that identifies that respective second feature and a subset of the plurality of second features including references identifying a feature identifier of a particular first feature of the plurality of first features; and
    a processor operable to:
    generate a table of edit data including edits to the plurality of first features, each edit including an associated feature identifier of the respective first features, the edits to the plurality of first features being associated with a value and the table including a status column describing a status of the edits for a particular value as in an editing status where the edits to the plurality of first features are not accessible by client devices;
    generate a second version of each of the second features by updating the references identifying the feature identifier of the particular first feature based on the value and the table of edits;
    store the second versions of each of the second features in the second partition of the repository; and
    update the status column to a live state where the edits for the particular value are accessible by client devices.

11. The computer of claim 10, wherein the processor is further operable to receive a request including a feature identifier from a given one of the client devices;

identify a first feature in the repository by searching the table of edits for the feature identifier and by searching the second versions of each of the second features in the second partition for the feature identifier; and transmit the identified feature to the client device.

12. The computer of claim 10, wherein the processor is further operable to:

receive a request including a feature identifier from a given one of the client devices;

identify a second feature in the repository by searching the table of edits for the feature identifier and by searching the second versions of each of the second features in the second partition for the feature identifier; and transmit the identified feature to the client device.

13. The computer of claim 10, wherein the first partition of the memory further includes a subset of the plurality of first features that include references having the feature identifiers of other ones of the first features, and the first partition includes no references including the feature identifiers of any second features.

14. The computer of claim 10, wherein the second partition of the memory further includes, for each of the plurality of second features, a timestamp indicating a latest edit to the respective second feature, and wherein the processor is further operable to generate a timestamp for each second version of the second features when the processor generates a second version of each of the second features.

15. The computer of claim 10, wherein the processor is further operable to generate a third version of a particular one of the second features independent of the value.

16. The computer of claim 10, wherein the processor is further operable to:

generate edit data associated a second value for the table; and generate a reference to edit data associated with the second value and a reference to edit data associated with the particular value when generating a second version of a particular one of the second features.

17. The computer of claim 16, wherein the processor is further operable to:

before updating the status column to a live state, receive a request including a feature identifier from a given one of the client devices;

identify the second version of the particular one of the second features based on the received feature identifier; and transmit the second version of the particular one of the second features and the reference to edit data associated with the second value.

18. The computer of claim 16, wherein the processor is further operable to:

after updating the status column to a live state, receive a request including a feature identifier from a given one of the client devices;

identify the second version of the particular one of the second features; and transmit the second version of the particular one of the second features and the reference to edit data associated with the particular value.

* * * * *

UNITED STATES PATENT AND TRADEMARK OFFICE
CERTIFICATE OF CORRECTION

PATENT NO. : 8,527,478 B1  
APPLICATION NO. : 12/973180  
DATED : September 3, 2013  
INVENTOR(S) : Seth Goldman et al.

Page 1 of 1

It is certified that error appears in the above-identified patent and that said Letters Patent is hereby corrected as shown below:

Title Page

On the face of the patent [57] ABSTRACT, line 3, delete "consisting" and insert therefor --consistent--.

Claims

Column 12, line 13, claim 7, after "associated" insert --with--.
Column 12, line 67, claim 11, after "to" insert --:--.
Column 13, line 19, claim 13, "include" should read --includes--.
Column 14, line 3, claim 16, after "associated" insert --with--.

Signed and Sealed this
Second Day of February, 2016

Michelle K. Lee
*Director of the United States Patent and Trademark Office*